United States Patent [19]

Welsh et al.

[11] 4,448,760

[45] May 15, 1984

[54] CONTINUOUS PROCESS FOR THE PREPARATION OF MANGANITE, MNOOH

[75] Inventors: Jay Y. Welsh, Catonsville; Denis F. DeCraene, Elkridge; Irving Sochol, Baltimore, all of Md.

[73] Assignee: Chemetals Incorporated, Baltimore, Md.

[21] Appl. No.: 428,540

[22] Filed: Sep. 30, 1982

[51] Int. Cl.$^3$ .............................................. C01G 45/02
[52] U.S. Cl. ..................................... 423/605; 423/50; 423/395
[58] Field of Search .......................... 423/605, 50, 395

[56] References Cited

U.S. PATENT DOCUMENTS 3,780,159  12/1973  Welsh ................................. 423/605
4,006,217  2/1977   Faher et al. ........................ 423/605

OTHER PUBLICATIONS

Chemical Abstracts, 26, p. 5025, Abstract of C. Montemartini and E. Vernazza, Industria Chimica 7, 577–582, (1932).
Bailar et al., "Comprehensive Inorganic Chemistry", Pergamon Press, Oxford, 1973, p. 825.

*Primary Examiner*—Herbert T. Carter
*Attorney, Agent, or Firm*—Lyon & Lyon

[57] ABSTRACT

A process of preparing manganite, MnOOH, from an aqueous manganese (II) nitrite solution by a continuous two-step decomposition process in the presence of an "active" solid surface.

8 Claims, No Drawings

CONTINUOUS PROCESS FOR THE PREPARATION OF MANGANITE, MNOOH

FIELD OF THE INVENTION

The invention relates to an improved process for preparing manganite, MnOOH, from an aqueous solution containing manganese (II) nitrite.

BACKGROUND OF THE INVENTION

Manganese oxide hydrate, α-MnO(OH), also known as groutit, may be prepared by the chemical or electrochemical reduction of γ-manganese dioxide, according to U.S. Pat. No. 3,427,128. The crystal structure of groutit has been described by Collin and Lipscomb in Acta Cryst., Vol. 2, pp. 104–106 (1949).

C. Montemartini and E. Vernazza in Industria Chimica, volume 7, pages 557–82 (1932) describe the decomposition of manganese (II) nitrite with water to yield manganese (II) hydroxide, which further reacts to form $Mn_2O_3$.

According to U.S. Pat. No. 4,006,217 manganese (II) hydroxide may be oxidized to form MnOOH. The MnOOH product may then be air-oxidized to form manganese dioxide. However, this process has the disadvantage of being very time-consuming.

SUMMARY OF THE INVENTION

The present invention provides an improved process for the preparation of manganite, MnOOH, from an aqueous solution containing manganese (II) nitrite. In the present invention an aqueous solution containing manganese (II) nitrite is contacted with an active surface (as described below) to promote the formation of manganite. The aqueous manganese (II) nitrite solution in contact with an active surface is heated, and decomposed to form manganite. Surprisingly the manganite product formed by the decomposition of manganese (II) nitrite, according to the present invention, is alkali and alkaline-earth free, even if the original aqueous manganese (II) nitrite solution contained alkali and/or alkaline earth compounds.

The manganite produced by the present invention is useful to produce $Mn_3O_4$. As mentioned above, the manganite produced by the present invention may also be air-oxidized to produce manganese dioxide.

It is a feature of the present invention that it provides a continuous two-step process for the preparation of manganite by the thermal decomposition of an aqueous manganese (II) nitrite solution.

It is an advantage of the present invention that the manganite product formed by the decomposition of manganese (II) nitrite is characterized by a high surface area.

It is another advantage of the present invention that the manganite product formed by the decomposition of manganese (II) nitrite filters and washes exceptionally well.

A further advantage of the present invention is that the manganite product produced by the decomposition of manganese (II) nitrite is alkali and alkaline-earth free, even if the original aqueous manganese (II) nitrite solution contained alkali and/or alkaline-earth compounds.

Still other advantages of the invention will be readily apparent to those of ordinary skill in the art from the detailed description of the invention which follows.

DETAILED DESCRIPTION OF THE INVENTION

The process for the preparation of manganite, MnOOH, from an aqueous solution containing manganese (II) nitrite may be described by the equation:

$$5Mn(NO_2)_2 + 2H_2O \rightarrow 4MnOOH + 8NO + Mn(NO_3)_2$$

As will be seen from the following description, the chemistry of manganese (II) nitrite is quite complex, especially with respect to its decomposition.

It has been observed that the rate of decomposition of manganese (II) nitrite is second order with respect to nitrite concentration. That is, the rate of decomposition of manganese (II) nitrite varies as the square of the nitrite concentration. It has also been observed than an aqueous manganese (II) nitrite solution can be heated far above its equilibrium decomposition temperature if no "active" solid surface is present. Surprisingly, it has been found that an aqueous manganese (II) nitrite solution can be heated approximately 40° to 50° C. above its equilibrium decomposition temperature, without effecting decomposition of manganese (II) nitrite, if no "active" solid surface is present. It has been found that the "active" solid surface necessary to effect the decomposition of manganese (II) nitrite is the surface of manganite particles.

In the presence of an "active" solid surface, appreciable decomposition of aqueous manganese (II) nitrite solution can occur at temperatures above 30° C. The decomposition of manganese (II) nitrite has a very high activation energy, about 33,000 calories per mole. This means that the rate of reaction is markedly affected by temperature. The rate of reaction changes by a factor of about five for each 10° C. change in temperature. Control of the temperature is therefore critical in the process of the present invention.

The pH of the aqueous manganese (II) nitrite solution is also quite critical because of the possibility of loss of nitrite ion by decomposition to nitric oxide (NO) and nitric acid. The equations involved are:

$$Mn(NO_2)_2 + 2HNO_3 \rightarrow Mn(NO_3)_2 + 2HNO_2$$

$$3HNO_2 \rightarrow 2NO + HNO_3 + H_2O$$

The loss of nitrite ion by decomposition according to the above equations would be much worse if the nitrite ion were not strongly complexed. It has been experimentally observed that the effective strength of the nitrite ion in the aqueous manganese (II) nitrite solution is only about 0.04 times its actual value. This surprising, experimentally observed fact is very important for the successful operation of the process of the present invention.

Practically, the decomposition of aqueous manganese (II) nitrite to produce manganite should satisfy three conditions:

First, it is important that the process for the preparation of manganite by the decomposition of an aqueous manganese (II) nitrite solution be a continuous process.

Second, it is important that the decomposition of the aqueous manganese (II) nitrite be substantially complete; and Lastly, it is important that the manganite product should have a high surface area, preferably at least one square meter per gram. This requires that the manganite crystals be very small. The process of the present invention satisfies all of these factors.

The present invention provides a continuous two-step process for the preparation of manganite by the thermal decomposition of an aqueous manganese (II) nitrite solution. The two steps of the present process are operated in series. In the first step, a non-equilibrium decomposition of approximately 80 to 95% of the manganese (II) nitrite in the original aqueous feed solution is effected in a decomposition tank at temperatures of at least about 90° C., but not more than about 100° C.

It has been found that the ratio of the flow rate of the virgin aqueous feed solution to the volume of the first decomposition tank, in which the first step of the two-step decomposition is effected, must be carefully controlled. It has been found that at a constant flow rate, a large decomposition tank promotes equilibrium crystal growth of the manganite product, resulting in large MnOOH crystals having an undesirably low surface area. Alternatively, a small decomposition tank (at the same flow rate) results in excessive formation of manganite product on the walls of the decomposition tank: resulting in poor heat transfer and making uniform heat transfer difficult. In accordance with the present invention it has been found that the ratio of the flow rate of the original aqueous feed solution (unit volume/minute) to the volume of the first decomposition tank (tank volume) must vary between about:

$$\frac{\text{unit volume/minute}}{\text{tank volume}} = \frac{1}{90} \text{ to } \frac{1}{160}$$

That is, the volume of the first decomposition tank must be between about 90 to about 160 times the flow rate of the virgin aqueous feed solution.

The second step of the two-step continuous decomposition of the present invention is effected in a much larger tank, about 8 to 12 times the volume of the first decomposition tank. In this second step the manganese (II) nitrite in the aqueous slurry remaining after the first decomposition step is then decomposed. Despite the relatively large volume of the second decomposition tank, the sequential process of the present invention permits only limited crystal growth of the manganite product. Although as discussed above, the large volume of the second decomposition tank promotes equilibrium crystal growth, since only about 5% to 20% of the manganese (II) nitrite in the original aqueous feed solution is decomposed in the second decomposition tank, any crystal growth is equally spread over the large number of small manganite crystal produced in the first, nonequilibrium, decomposition step. The second step of the two-step continuous decomposition is effected at a temperature of at least about 105° C., but not more than about 115° C.

Thus it can be seen that the two-step continuous decomposition process of the present invention achieves each of the three conditions described above. It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains

What is claimed is:

1. A continuous process for preparing alkali and alkaline-earth free manganite, comprising the steps of:
   continuously feeding a first decomposition tank with an aqueous solution containing manganese (II) nitrite,
   contacting said aqueous manganese (II) nitrite solution in said first decomposition tank with an active surface to promote the formation of manganite,
   maintaining said aqueous manganese (II) nitrite solution in said first decomposition tank at a temperature sufficient to effect formation of manganite,
   decomposing approximately 80% to 95% of the manganese (II) nitrite in said aqueous manganese (II) nitrite solution to form manganite,
   continuously transferring said aqueous manganese (II) nitrite solution containing manganite to a second decomposition tank,
   maintaining said aqueous manganese (II) nitrite solution containing manganite in said second decomposition tank at a temperature sufficient to effect formation of manganite, and
   decomposing the remaining manganese (II) nitrite in said aqueous manganese (II) nitrite solution to form manganite.

2. The process set forth in claim 1, wherein said active surface in said first decomposition tank is a manganite surface.

3. The process set forth in claim 1, wherein said manganite has a surface area of at least about one square meter per gram.

4. The process set forth in claim 1, wherein said aqueous manganese (II) nitrite solution in said first decomposition tank is maintained at a temperature from about 90° C. to about 100° C. to effect formation of manganite.

5. The process set forth in claim 1, wherein said aqueous manganese (II) nitrite solution in said second decomposition tank is maintained at a temperature from about 105° C. to about 115° C. to effect formation of manganite.

6. The process set forth in claim 1, wherein the ratio of the flow rate of said aqueous manganese (II) nitrite solution to said first decomposition tank (unit volume/minute) to the volume of said first decomposition tank (tank volume) varies between about:

$$\frac{\text{unit volume/minute}}{\text{tank volume}} = \frac{1}{90} \text{ to } \frac{1}{160}$$

7. The process set forth in claim 6, wherein the ratio of the flow rate of said aqueous manganese (II) nitrite solution to said first decomposition tank to the volume of said first decomposition tank is about (1/125).

8. The process set forth in claim 6, wherein the volume of the second decomposition tank is about 8 to 12 times the volume of the first decomposition tank.

* * * * *